United States Patent
Snowbarger (10) Patent No.: US 8,996,328 B2
(45) Date of Patent: Mar. 31, 2015

(54) METHODS, APPARATUS AND ARTICLES OF MANUFACTURE TO TEST SAFETY INSTRUMENTED SYSTEM SOLENOIDS

(75) Inventor: Jimmie L. Snowbarger, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 1466 days.

(21) Appl. No.: 12/648,695

(22) Filed: Dec. 29, 2009

(65) Prior Publication Data

US 2011/0160917 A1 Jun. 30, 2011

(51) Int. Cl.
*F16K 37/00* (2006.01)
*G05B 23/02* (2006.01)

(52) U.S. Cl.
CPC ........ *G05B 23/0256* (2013.01); *F16K 37/0083* (2013.01)
USPC .......................................... 702/114; 700/282

(58) Field of Classification Search
CPC ... F15B 5/00; F16K 37/0041; F16K 37/0083; E03B 1/00
USPC ............. 370/225; 700/282, 286; 702/50, 183, 702/114; 137/14, 457, 486, 487.5
See application file for complete search history.

(56) References Cited

U.S. PATENT DOCUMENTS

| | | | |
|---|---|---|---|
| 4,861,115 A * | 8/1989 | Petersen ........................ 303/15 |
| 5,325,884 A * | 7/1994 | Mirel et al. .................... 137/110 |
| 5,325,894 A * | 7/1994 | Kooy et al. ....................... 141/4 |
| 5,573,032 A * | 11/1996 | Lenz et al. ..................... 137/486 |
| 5,665,898 A | 9/1997 | Smith et al. |
| 5,970,997 A * | 10/1999 | Hudson et al. .................... 137/1 |
| 6,862,547 B2 * | 3/2005 | Snowbarger et al. .......... 702/114 |
| 7,464,721 B2 * | 12/2008 | Perry et al. ....................... 137/14 |
| 8,184,562 B2 * | 5/2012 | Tapperson et al. ............. 370/310 |
| 2002/0145515 A1 * | 10/2002 | Snowbarger et al. ......... 340/514 |
| 2006/0219299 A1 * | 10/2006 | Snowbarger ............... 137/487.5 |
| 2007/0018127 A1 | 1/2007 | Seberger |

(Continued)

FOREIGN PATENT DOCUMENTS

| | | |
|---|---|---|
| JP | 2009503645 | 1/2009 |
| JP | 2009267258 | 12/2009 |
| WO | 9917042 | 4/1999 |

OTHER PUBLICATIONS

International Searching Authority, "International Search Report," issued in connection with counterpart international application serial No. PCT/US2010/056504, mailed Mar. 31, 2011, 4 pages.

(Continued)

*Primary Examiner* — Bryan Bui
(74) *Attorney, Agent, or Firm* — Hanley, Flight & Zimmerman, LLC (57) ABSTRACT

Example methods, apparatus and articles of manufacture to test safety instrumented system (SIS) solenoids are disclosed. A disclosed valve position control apparatus includes a relay to control a state of a solenoid and a valve positioner including a transmitter to transmit a solenoid test signal to the relay, electrical contacts to communicatively couple the solenoid test signal to the relay via one or more wires, and a solenoid tester to generate the solenoid test signal and to monitor a response of the solenoid when the solenoid test signal is transmitted to the relay to verify an operation of the solenoid.

17 Claims, 4 Drawing Sheets

(56) References Cited

U.S. PATENT DOCUMENTS

2007/0255515 A1* 11/2007 Hoehner et al. ............... 702/51
2008/0236679 A1* 10/2008 Esposito .................... 137/487.5

OTHER PUBLICATIONS

International Searching Authority, "Written Opinion of the International Searching Authority," issued in connection with counterpart international application serial No. PCT/US2010/056504, mailed Mar. 31, 2011, 6 pages.

Cahill, "Checking Your Safety Solenoid Valves," Emerson Process Experts, http://www.emersonprocessxperts.com/archives/2006/12/checking_your_s.html, Dec. 2006 (2 pages).

Emerson Process Management, DVC6000f Series Instruction Manual, Aug. 2007 and updated Feb. 2009 (396 pages).

Siemens AG, "Increased Safety through various Combinations of Partial Stroke Testing and Solenoid Valve Testing," May 11, 2009 (13 pages).

Summers, "Improve Facility SIS Performance and Reliability," Jun. 15, 2002 (12 pages).

Mostia, "Testing of SIS Valves," date unknown (22 pages).

Cahill, "Questions about DVC 6000 SIS and Solenoids," Emerson Process Experts, http://www.emersonprocessxperts.com/archives/2008/09/questions_about.html, Sep. 2008 (4 pages).

International Bureau, "International Preliminary Report on Patentability," issued in connection with international application serial No. PCT/US2010/056504, mailed Jul. 12, 2012, 8 pages.

Japanese Patent Office, English version of "Notice of Reasons for Rejection," issued in connection with Japanese Patent Application No. 2012-547078, issued on Jul. 31, 2014, 8 pages.

\* cited by examiner

METHODS, APPARATUS AND ARTICLES OF MANUFACTURE TO TEST SAFETY INSTRUMENTED SYSTEM SOLENOIDS

FIELD OF THE DISCLOSURE

This disclosure relates generally to safety instrumented systems (SIS) and, more particularly, to methods, apparatus and articles of manufacture to test SIS solenoids.

BACKGROUND

Process control systems, like those used in chemical, petroleum or other processes, typically include one or more centralized process controllers communicatively coupled to at least one host or operator workstation and to one or more field devices via analog, digital and/or combined analog/digital buses. The field devices, which may be, for example, valves, valve positioners, switches and/or transmitters (e.g., temperature sensors, pressure sensors and flow rate sensors), perform functions within the process such as opening and/or closing valves and/or measuring process parameters. The process controllers receive signals indicative of process measurements made by the field devices and/or other information pertaining to the field devices, use this information to implement control routines and then generate control signals that are sent over the buses and/or other communication paths to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more software applications that perform campaign management functions, maintenance management functions, virtual control functions, diagnostic functions, real-time monitoring functions, safety-related functions, configuration functions, etc. within the process control system.

Some process control systems or portions thereof may present significant safety risks. For example, chemical processing plants, power plants, etc. may implement critical processes that, if not properly controlled and/or shut down rapidly using a predetermined shut down sequence, could result in significant damage to people, the environment and/or equipment. To address the safety risks associated with process control systems having such critical processes, many process control system providers offer products compliant with safety-related standards such as, for example, the International Electrotechnical Commission (IEC) 61508 standard and the IEC 61511 standard.

Process control systems that are compliant with one or more known safety-related standards are typically implemented using an SIS architecture. In SIS architectures, the controllers and field devices associated with the basic process control system, which is responsible for the continuous control of the overall process, are physically and logically separate from special-purpose field devices and other special-purpose control elements associated with the SIS, which is responsible for the performance of safety instrumented functions to ensure the safe shutdown of the process in response to control conditions that present a significant safety risk. In particular, compliance with many known safety-related standards requires a basic process control system to be supplemented with special-purpose control elements such as logic solvers, SIS controllers, safety certified field devices (e.g., sensors, final control elements such as, for example, pneumatically actuated valves and/or solenoid valves), data redundancy devices and routines (e.g., redundancy links, cyclical redundancy checks, etc.), and safety certified software or code (e.g., certified applications, function modules, function blocks, etc.).

Some process plants, in addition to process control valves, include a safety shut-off valve (e.g., an emergency shut-off valve) for each of the process control valves to quickly stop the flow of fluid in response to, for example, a system failure. These safety shut-off valves are controlled by the SIS. An example safety shut-off valve is a solenoid valve where the SIS selects or controls a power supply of a solenoid to control the solenoid valve. When a solenoid is powered it and, thus, the solenoid valve will be in a first position or state (e.g., open). When power is removed from the solenoid, the solenoid and, thus, the solenoid valve will be in a second position or state (e.g., closed). Solenoid valves are typically of two types: fail-to-open, for which the valve is open when power is removed from the solenoid, and fail-to-close, for which the valve is closed when power is removed from the solenoid. Example solenoid valves include the EF8316 and EF8310 solenoid valves manufactured by Asco® Valve, Inc.

SUMMARY

Example methods, apparatus and articles of manufacture to test safety instrumented system solenoids are disclosed. A disclosed valve position control apparatus includes a relay to control a state of a solenoid and a valve positioner including a transmitter to transmit a solenoid test signal to the relay, electrical contacts to communicatively couple the solenoid test signal to the relay via one or more wires, and a solenoid tester to generate the solenoid test signal and to monitor a response of the solenoid when the solenoid test signal is transmitted to the relay to verify an operation of the solenoid.

An example method includes selecting a power supply interruption control signal to select a state of a safety instrumented system (SIS) solenoid, transmitting the power supply interruption control signal from a valve controller to a relay via one or more wires to configure the SIS solenoid to the selected state, and monitoring a response of the SIS solenoid to the selected state to verify an operation of the SIS solenoid.

Certain examples are shown in the above-identified figures and described in detail below. The figures are not necessarily to scale and certain features and certain views of the figures may be shown exaggerated in scale or in schematic for clarity and/or conciseness. It is to be understood that while the following disclosure provides many different embodiments or examples for implementing different features of various embodiments, other embodiments may be implemented and/or structural changes may be made without departing from the scope of this disclosure. Further, while specific examples of components and arrangements are described below these are, of course, merely examples and are not intended to be limiting. In addition, the present disclosure may repeat reference numerals and/or letters in the various examples. This repetition is for the purpose of clarity and does not in itself dictate a relationship between the various embodiments and/or example configurations discussed. Moreover, the depiction or description of a first feature over or on a second feature may include embodiments in which the first and second elements are implemented in direct contact, and may also include embodiments in which other elements may be interposed between the first and second elements, such that the first and second elements need not be in direct contact.

DETAILED DESCRIPTION

Traditionally, safety instrumented system (SIS) controllers test the safety overrides of process control valves by temporarily interrupting a solenoid valve power supply signal. Such temporary interruptions of the power supply signal should cause the solenoid valve to trip and cause a respective process control valve to begin moving toward its emergency or safety position (e.g., fully closed or fully open depending on the process). If the power supply signal is only temporarily interrupted, the process control valve will only be partially stroked or partially moved toward its emergency or safety position. If the process control valve is detected as moving in the correct direction in response to the temporary interruption of the power supply signal, the SIS controller can determine that the solenoid valve and the process control valve are collectively operating as intended. However, if the process control valve does not move as expected, the example SIS controller cannot determine whether it is the solenoid valve and/or the process control valve that is not operating as intended. This type of test of the process control valve by the example SIS controller is often referred to in the industry as a partial stroke test (PST).

To overcome at least these deficiencies, the example valve positioners disclosed herein include a solenoid tester to test the solenoid and/or the solenoid valve separately from the process control valve. The disclosed example valve positioners also include integrated contacts, terminals and/or connectors that may be used to electrically couple control signals from the solenoid tester to a solid-state relay (SSR). The SSR is controlled via the control signals to trip the solenoid. An example solenoid tester monitors an output, state and/or position of the solenoid and/or the solenoid valve while the solenoid is temporarily tripped to determine whether the solenoid and/or the solenoid valve are operating as intended. In some examples, the output of the solenoid and/or the position of a solenoid plunger are monitored. Additionally or alternatively, a pneumatic output of the solenoid valve may be monitored.

Figure 1:
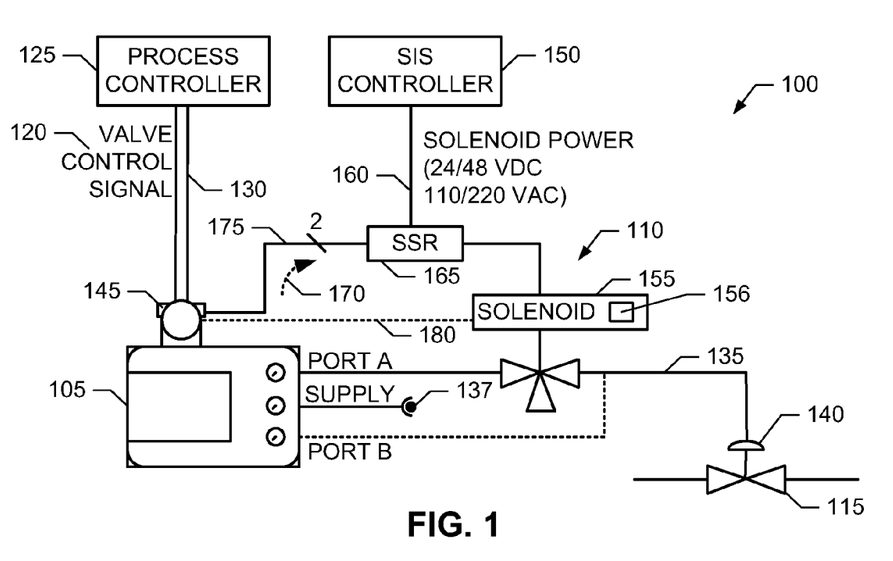
FIG. 1 is a schematic illustration of an example process control system having a valve positioner according to one or more aspects of the present disclosure.
Figure 2:
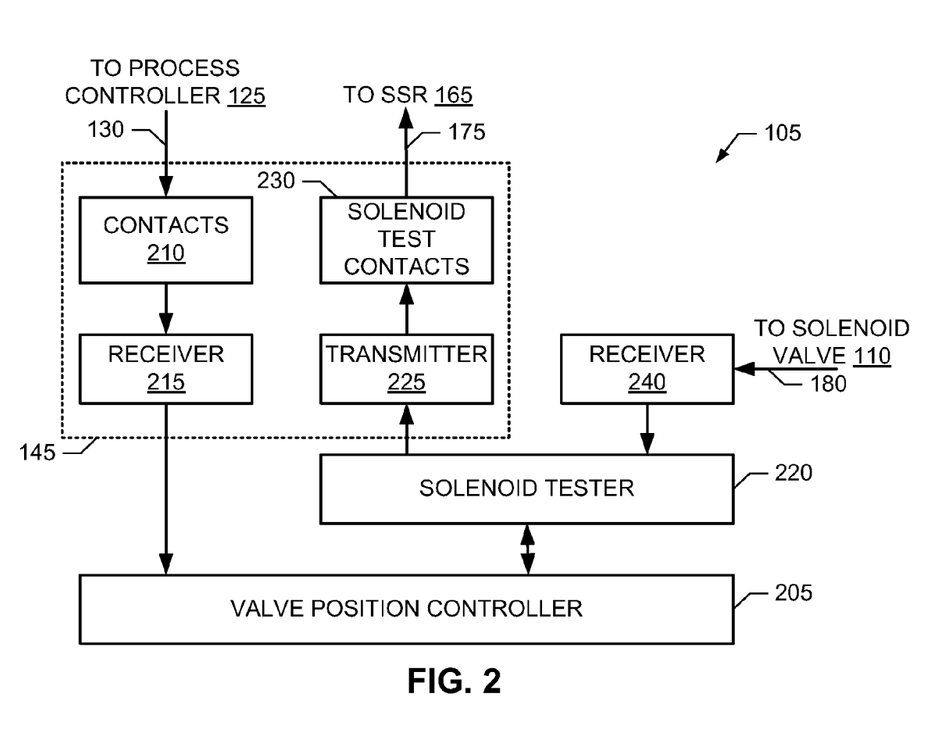
FIG. 2 illustrates an example manner of implementing the example valve positioner of FIG. 1.

FIG. 1 depicts an example process control system 100 having a valve positioner 105 to, among other things, test an SIS solenoid valve 110 and/or an SIS solenoid 155 associated with the solenoid valve. FIG. 2 illustrates an example manner of implementing the example valve positioner 105 of FIG. 1. The example valve positioner 105 includes any type of valve position controller 205 (FIG. 2) to control the position (e.g., percentage open or closed) of a process control valve 115 based on a valve control signal 120 received from a process controller 125 via one or more wires and/or communication buses 130. The example valve position controller 205 controls the position of the example process control valve 115 by controlling, adjusting and/or selecting a pressure of a pneumatic control line 135. The pressure of the pneumatic control line 135 controls the position of an actuator 140 associated with the process control valve 115 and, thus, the position of the process control valve 115. The pressure of the pneumatic control line 135 may be controlled by regulating a flow of fluid from a pneumatic supply 137 into the pneumatic control line 135. The example valve position controller 205 receives one or more signals representative of the present or current position of the process control valve 115 via any number and/or type(s) of communication signals and/or communication paths, which are not depicted in FIG. 1 or 2 for purposes of clarity. Using any number and/or type(s) of algorithm(s), method(s) and/or logic, the example valve position controller 205 controls the pressure of the pneumatic control line 135 so that the process control valve 115 has a position substantially corresponding to a position specified and/or indicated by the valve control signal 120.

The example wire(s) and/or bus(es) 130 are electrically coupled to a terminal box or housing 145 of the example valve positioner 105 via one or more contacts, connectors and/or terminals 210 (FIG. 2) within the terminal housing 145. To receive the valve control signal 120, the example terminal box 145 also includes a receiver 215 to convert the analog valve control signal 120 into digital values and/or digital samples suitable for processing by the example valve position controller 205. In some examples, there are two wires 130 and two contacts 210, the valve control signal 120 comprises a 4-20 mA loop current signal propagated on the two wires 130, and the example receiver 215 comprises a highway addressable remote transducer (HART) receiver. While the example contacts 210, receiver 215, transmitter 225 and solenoid test contacts 230 are depicted in FIG. 2 as being implemented within the example terminal housing 145, it may be implemented elsewhere within the valve positioner 105.

To allow an SIS controller 150 to quickly stop the flow of fluid(s) and/or other material(s) through the process control valve 115 in response to, for example, a system failure or an emergency, the example solenoid valve 110 is pneumatically interposed in the pneumatic control line 135 between the valve positioner 105 and the process control valve 115. By controlling the state or position of the solenoid 155 of the solenoid valve 110, the example SIS controller 150 can interrupt or depressurize the pneumatic control line 135 controlling the position of the process control valve 115. The SIS controller 150 controls the state or position of the solenoid 155 by controlling, selecting or adjusting a power supply signal 160 of the solenoid 155. When the power supply signal 160 is selected to have a first voltage (e.g., 24 VDC, 48 VDC, 110 VAC or 220 VAC), the solenoid 155 is in a first state allowing the valve positioner 105 to control the pressure in the pneumatic control line 135. However, when the power supply signal 160 is interrupted (e.g., is 0 V), the solenoid 155 is in a second or different state disconnecting the valve positioner 105 from the pneumatic control line 135. Alternatively, a 0 V power supply signal 160 can correspond to the first state and a non-zero voltage (e.g., 24 VDC, 48 VDC, 110 VAC or 220

VAC) correspond to the second state. By selecting, adjusting and/or controlling the voltage of the power supply 160 of the solenoid 155 the SIS controller can override the position of the process control valve 115 for safety or emergency reasons.

Traditionally, the example SIS controller 150 tests the safety override of the process control valve 115 by temporarily interrupting the power supply signal 160. Such temporary interruptions of the power supply signal 160 should cause the process control valve 115 to begin moving toward its emergency or safety position (e.g., fully closed or fully open depending on the process). However, because the power supply signal 160 is only temporarily interrupted, the process control valve 115 will only be partially stroked or moved toward its emergency or safety position. If the process control valve 115 is detected as moving in the correct direction in response to the temporary interruption of the power supply signal 160, the SIS controller 150 can determine that the solenoid valve 110 and the process control valve 115 are collectively operating as intended. However, if the process control valve 115 does not move as expected, the example SIS controller 150 cannot determine whether it is the solenoid valve 110 and/or the process control valve 115 that is not operating as intended.

To allow the valve positioner 105 to test the solenoid valve 110 independent of the example process control valve 115, the system 100 of FIG. 1 includes an SSR 165. The example SSR 165 of FIG. 1 is electrically interposed between the power supply signal 160 provided by the SIS controller 150 and the solenoid valve 110. A solenoid tester 220 (FIG. 2) of the valve positioner 105 is configured to control the state or position of the SSR 165 via a control signal 170. The example solenoid tester 220 can control the SSR 165 via the control signal 170 to a first state where the power supply signal 160 is electrically coupled to the solenoid valve 110 or to a second state where the power supply signal 160 is disconnected and/or electrically isolated from the solenoid valve 110. In other words, the control signal 170 represents a power supply interruption signal that indicates to the SSR 165 whether or not to interrupt, disconnect and/or electrically isolate the power supply signal 160 from the solenoid valve 110. Example solid-state relays that may be used to implement the example SSR 165 include, but are not limited to, a photo-coupled relay such as the model # 348-431 relay manufactured by Radionics, a transformer-coupled relay such as the model # HDA-3V25 relay manufactured by Power-IO™, and a hybrid SSR such as the model #24D25-17 relay manufactured by Opto 22.

The example control signal 170 is transmitted to the SSR 165 by a transmitter 225 via one or more solenoid test contacts, terminals and/or connectors 230 and respective wires 175. The example transmitter 225 and the example solenoid test contacts 230 may be implemented within the terminal box or housing 145 as depicted in FIG. 2. Alternatively, the transmitter 225 and/or the example solenoid test contacts 230 may be implemented elsewhere within the example valve positioner 105.

The example transmitter 225 converts digital control values and/or digital control samples generated by the solenoid tester 220 into the analog control signal 170 suitable for transmission to the SSR 165 via the contact(s) 230 and the wire(s) 175. In some examples, there are two wires 175 and two solenoid test contacts 230, with a first of the wires 175 carrying a ground signal or voltage and a second of the wires 175 carrying an analog control voltage that controls the state of the solenoid 155.

The example solenoid tester 220 monitors the position, state and/or operation of the solenoid 155 and/or the solenoid valve 110 via a monitor signal 180. Example monitor signals 180 include, but are not limited to, a signal representing an electrical or pneumatic output of the solenoid 155 used to control the position of the solenoid valve 110, and a signal representing a solenoid plunger position. Such monitor signals 180 may be used by the solenoid tester 220 to determine whether a plunger 156 of the solenoid 155 travels sufficiently in response to an interruption of the power supply 160 by the SSR 165 that it can operate the solenoid valve 110 as intended during emergency or safety-based shutdowns.

A receiver 240 (FIG. 2) converts the monitor signal 180 into a digital signal and/or digital samples representative of the position and/or state of the solenoid 155 and/or the solenoid valve 110. By monitoring the digitized monitor signal 180 when the test control signal 170 is transmitted to the SSR 165, the example solenoid tester 220 can determine whether the solenoid 155 and/or the solenoid valve 110 are operating as intended. Because the test control signal 170 is used to only temporarily trip or change the state of the solenoid 155, the position of the process control valve 115 should only temporarily change by a small amount and for a short time period. Once the test control signal 170 is discontinued and/or is used to control the SSR 165 to return to its nominal state, the valve positioner 105 can restore the position of the process control valve 115 as needed. An example process that may be carried out by the example solenoid tester 220 and/or, more generally, by the example valve positioner 105 to test the solenoid 155 and/or the solenoid valve 110 is described below in connection with FIG. 5.

Additionally or alternatively, the solenoid tester 220 may monitor any number and/or type(s) of additional and/or alternative monitor signals. For example, the solenoid tester 220 may monitor the pressure of the pneumatic control line 135 downstream from the solenoid valve 110. If, for example, the actuator 140 is a single-acting actuator and, thus only a single pneumatic control line 135 is needed to control the position of the valve 115, an unused pneumatic port B of the valve positioner 105 may be pneumatically coupled to the pneumatic control line 135 to monitor the pressure of the pneumatic control line 135 downstream from the solenoid valve 110. In such an example, the receiver 240 may comprise a pressure transducer. When the state of the solenoid 155 is changed by the SSR 165, the solenoid tester 220 can monitor for an expected change in the pressure at the port B to determine whether the solenoid 155 and the solenoid valve 110 are collectively operating as intended.

Figure 3:
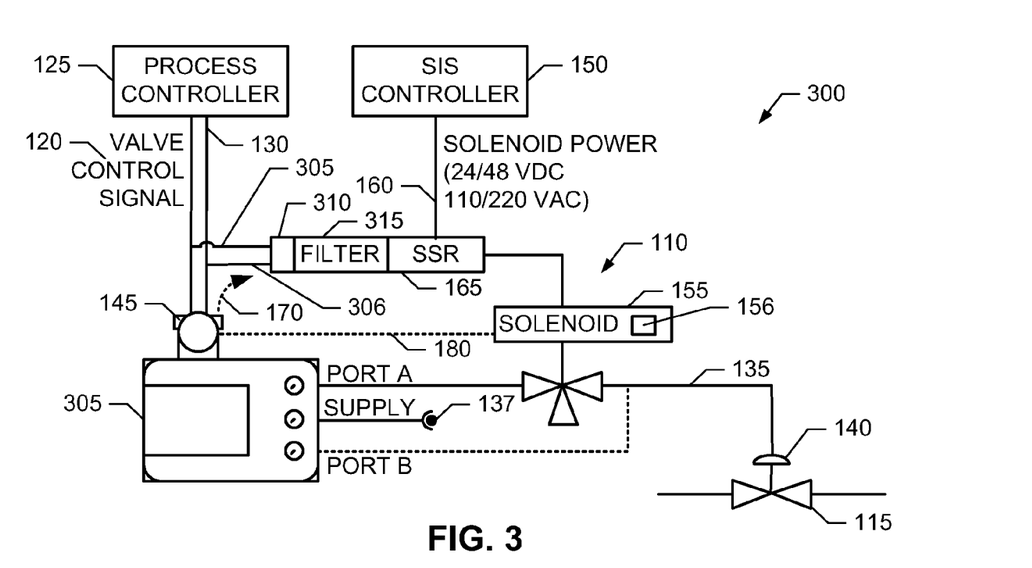
FIG. 3 is a schematic illustration of another example process control system having a valve positioner according to one or more aspects of the present disclosure.
Figure 4:
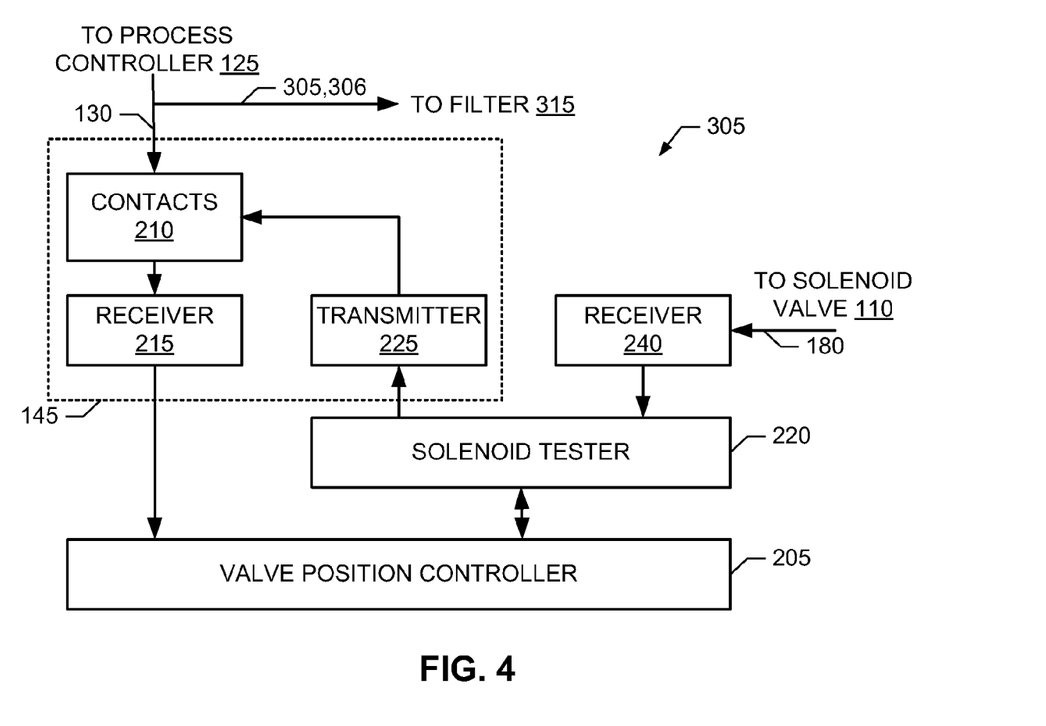
FIG. 4 illustrates an example manner of implementing the example valve positioner of FIG. 3.

FIG. 3 depicts another example process control system 300 having a valve positioner 305 to, among other things, test an operation of the safety instrumented system (SIS) solenoid valve 110. FIG. 4 illustrates an example manner of implementing the example valve positioner 305 of FIG. 3. Because some elements of the illustrated examples of FIGS. 3 and 4 are identical to those discussed above in connection with FIGS. 1 and 2, the description of identical elements is not repeated here. Instead, identical elements are illustrated with identical reference numerals in FIGS. 1-4, and the interested reader is referred back to the descriptions presented above in connection with FIGS. 1 and 2 for a complete description of those like-numbered elements.

In contrast to the illustrated example of FIGS. 1 and 2, in the example process control system 300 of FIG. 3, the example transmitter 225 transmits the control signal 170 to the SSR 165 via the same contacts, terminals and/or connectors 210 that are used to electrically couple the process controller 125 to the receiver 215 via the example wires 130. As such, wires 305 and 306 are electrically coupled between respective ones of the wires 130 and corresponding terminals, contacts or connectors 310 of a filter 315. In other words, the process controller 125, the example receiver 215, the example transmitter 225 and the example filter 315 communicate via and/or on the same communication bus 130, 305, 306. In some examples, signals and/or commands are communicated on the shared bus 130, 305, 306 using 4-20 mA loop currents, the example receiver 215 and the example filter 315 comprise respective HART receivers, and the example transmitter 225 comprises a HART transmitter.

The example filter 315 filters HART commands received via the wires 305 and 306 to identify and/or detect the solenoid valve test command 170. When the solenoid test command 170 is detected on the bus 305, 306, the example filter 315 changes the state of the SSR 165. In some examples, a first HART command is used to change the state of the SSR 165 to a first state and a second HART command is used to change the state of the SSR 165 to a second or different state. In other examples, a HART command is used to toggle between the first and second states of the SSR 165. While certain examples described herein implement HART communications and/or commands, the methods and apparatus disclosed herein may use any number and/or type(s) of additional and/or alternative communication protocol(s) and/or commands, such as those associated with Foundation Fieldbus and/or Profibus.

While an example process control systems 100 and 300 have been illustrated in FIGS. 1-4, the elements illustrated in FIGS. 1-4 may be combined, divided, re-arranged, eliminated and/or implemented in any way. Further, the example valve position controller 205, the example receiver 215, the example solenoid tester 220, the example transmitter 225, the example receiver 240, the example filter 315 and/or, more generally, the example valve positioners 105 and 305 may be implemented by hardware, software, firmware and/or any combination of hardware, software and/or firmware. Thus, for example, any of the example valve position controller 205, the example receiver 215, the example solenoid tester 220, the example transmitter 225, the example receiver 240, the example filter 315 and/or, more generally, the example valve positioners 105 and 305 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example valve position controller 205, the example receiver 215, the example solenoid tester 220, the example transmitter 225, the example receiver 240, the example filter 315 and/or, more generally, the example valve positioners 105 and 305 are hereby expressly defined to include a tangible medium such as a memory, a digital versatile disc (DVD), a compact disc (CD), etc. storing the software and/or firmware. Further still, the example process control systems 100 and 300 may include elements in addition to, or instead of, those illustrated in FIGS. 1-4, and/or may include more than one of any or all of the illustrated elements. For example, while a single valve positioner 105, a single solenoid valve 110 and a single process control valve 115 are shown in FIGS. 1 and 3, the example process control systems 100 and 300 may include any number and/or type(s) of process controllers, SIS controllers, valve positioners, solenoid valves and/or process control valves. Any or all of the additional valve positioners may implement the example solenoid tester 220, the example transmitter 225, the example test contacts 230 and the example receiver 240 to test a respective solenoid valve 110 via a respective SSR 165 and/or a respective filter 315.

Figure 5:
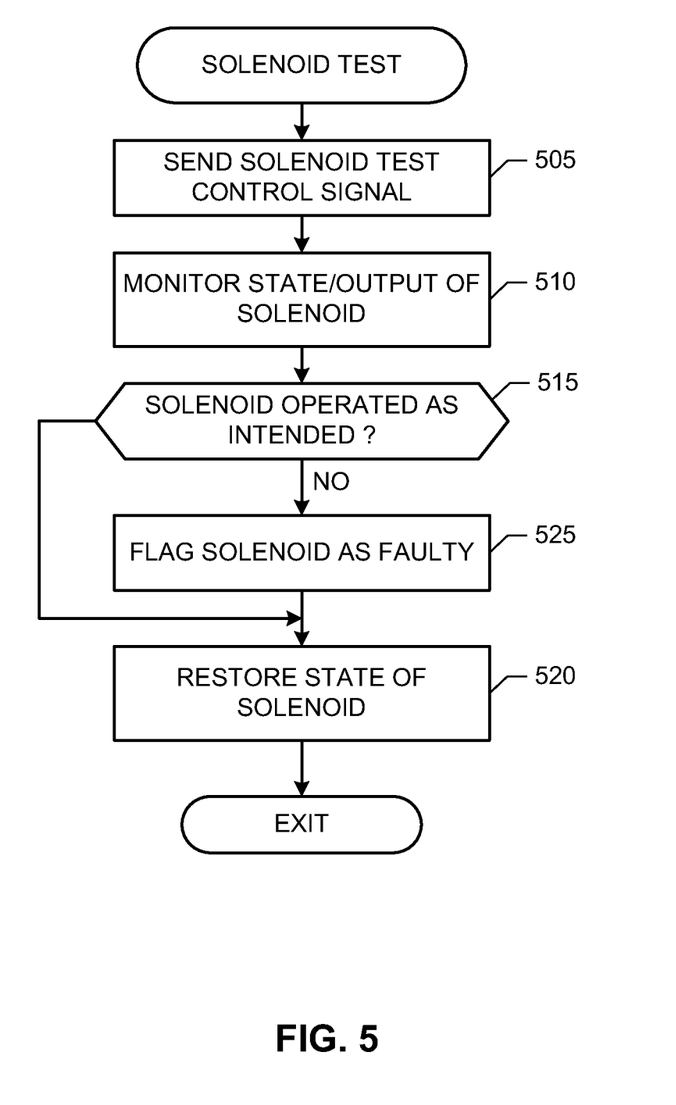
FIG. 5 is a flowchart representative of an example process that may be carried out to implement the example valve positioner of FIGS. 1-4.

FIG. 5 is a flowchart representative of an example process that may be carried out to implement the example solenoid tester 220 and/or the example valve positioners 105 and 305 of FIGS. 1-4. The example process of FIG. 5 may be carried upon when commanded by the example process controller 125 and/or the example SIS controller 150, and/or may be automatically carried out by the valve positioner 105, 305 on a periodic or aperiodic basis. The example process of FIG. 5 may be carried out by a processor, a controller and/or any other suitable processing device. For example, the process of FIG. 5 may be embodied in coded instructions stored on any article of manufacture, such as any tangible computer-readable medium. Example tangible computer-readable medium include, but are not limited to, a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 6). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example process of FIG. 5 may be implemented using any combination(s) of ASIC(s), PLD(s), FPLD(s), discrete logic, hardware, firmware, etc. Also, some or all of the example process of FIG. 5 may instead be implemented manually or as any combination of any of the foregoing techniques, for example, any combination of firmware, software, discrete logic and/or hardware. Further, many other methods of implementing the example operations of FIG. 5 may be employed. For example, the order of execution of the blocks may be changed, and/or one or more of the blocks described may be changed, eliminated, sub-divided, or combined. Additionally, any or all of the example process of FIG. 5 may be carried out sequentially and/or carried out in parallel by, for example, separate processing threads, processors, devices, discrete logic, circuits, etc.

The example process of FIG. 5 begins with the example solenoid tester 220 sending a solenoid test control signal 170 to the filter 315 and/or the SSR 165 via the example transmitter 225 (block 505). The solenoid tester 220 monitors the state, output and/or position of the solenoid 155 and/or the solenoid valve 110 via the monitor signal 180 (block 510). For example, the solenoid tester 220 can monitor the position of the solenoid plunger 156.

If the monitor signal 180 represents an intended operation of the solenoid 155 and/or the solenoid valve 110 (block 515), the example solenoid tester 220 sends a second test control signal 170 to the filter 315 and/or the SSR 165 to restore the previous state of the solenoid 155 and/or the solenoid valve 110 (block 520). Control then exits from the example process of FIG. 5.

If the monitor signal 180 does not represent an intended operation of the solenoid 155 and/or the solenoid valve 110

(block 515), the solenoid 155 and/or the solenoid valve 110 is flagged and/or identified as potentially faulty (block 525). Control then proceeds to block 520.

Figure 6:
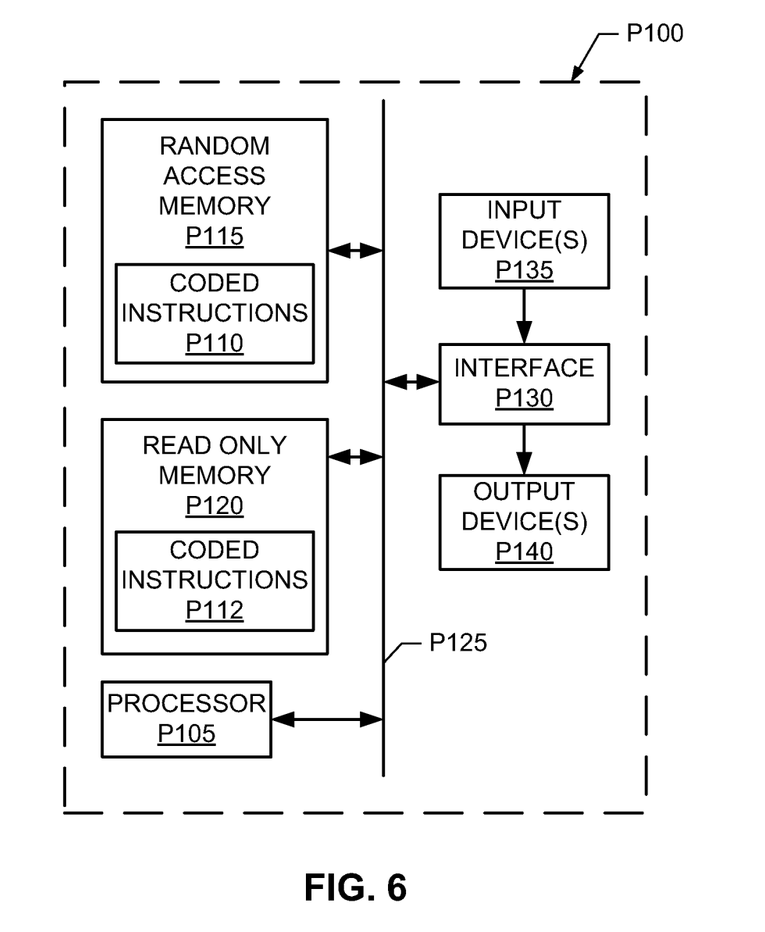
FIG. 6 is a schematic illustration of an example processor platform that may be used and/or programmed to carry out the example process of FIG. 5, and/or to implement any of all of the methods, apparatus and articles of manufacture disclosed herein.

FIG. 6 is a schematic diagram of an example processor platform P100 that may be used and/or programmed to implement the example solenoid tester 220 and/or the example valve positioners 105 and 305 of FIGS. 1-4. For example, the processor platform P100 can be implemented by one or more general-purpose processors, processor cores, microcontrollers, etc.

The processor platform P100 of the example of FIG. 6 includes at least one general purpose programmable processor P105. The processor P105 executes coded and/or machine-accessible instructions P110 and/or P112 stored in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 5 to implement the example methods, apparatus and articles of manufacture described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P125. The interface circuit P125 may be implemented by any type of interface standard, such as an external memory interface, serial port, general-purpose input/output, etc. One or more input devices P130 and one or more output devices P130 are connected to the interface circuit P125. The input devices P135 may be used to, for example, implement the example receivers 215 and 240. The output devices P140 may be used to, for example, implement the example transmitter 225.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A valve position control apparatus comprising:
    a relay to control a state of a solenoid to be operatively coupled to a process control valve; and
    a valve positioner including:
        a transmitter to transmit a solenoid test signal to the relay;
        electrical contacts to provide the solenoid test signal to the relay via one or more wires; and
        a solenoid tester having a processor to generate the solenoid test signal and to monitor a response of the solenoid when the solenoid test signal is transmitted to the relay to verify an operation condition of the solenoid independent of an operation of the process control valve.

2. A valve position control apparatus as defined in claim 1, further comprising a safety instrumented system (SIS) controller to test a safety operation of the process control valve by selecting a power supply signal for the solenoid and monitoring a position of the process control valve in response to the selection of the power supply signal, wherein the relay is to interrupt electrical connection of the selected power supply signal to the solenoid when the solenoid test signal is received.

3. A valve position control apparatus as defined in claim 1, wherein the valve positioner further comprises a receiver to receive a signal representative of a solenoid plunger position, the solenoid plunger position corresponding to the response of the solenoid, wherein the solenoid tester is to verify the operation of the solenoid based on the received signal.

4. A valve position control apparatus as defined in claim 1, wherein the valve positioner further comprises a receiver to receive a signal representative a pressure of a pneumatic output of a solenoid valve associated with the solenoid, wherein the solenoid tester is to verify the operation of the solenoid valve based on the received signal.

5. A valve position control apparatus as defined in claim 1, wherein the valve positioner further comprises:
    a receiver to receive a valve position control signal; and
    a valve position controller to control the position of the process control valve in response to the received valve position control signal.

6. A valve position control apparatus as defined in claim 1, wherein the relay is to interrupt electrical connection of a power supply signal to the solenoid when the solenoid test signal is received.

7. A valve position control apparatus as defined in claim 1, wherein the valve positioner further comprises:
    a receiver to receive a valve position control signal via the one or more wires; and
    a valve position controller to control the position of the process control valve in response to the received valve position control signal, wherein the transmitter comprises a highway addressable remote transducer (HART) transmitter and the solenoid test signal comprises a HART control signal.

8. A valve position control apparatus as defined in claim 7, further comprising a HART transducer in communication with the relay, the HART transducer to receive the solenoid test signal from the transmitter via the one or more wires and to control a state of the relay in response to the solenoid test signal.

9. A method comprising:
    selecting a power supply interruption control signal to select a test state of a safety instrumented system (SIS) solenoid operatively coupled to a process control valve;
    isolating operation of the process control valve from the SIS solenoid by transmitting the power supply interruption control signal from a valve controller to a relay via one or more wires to configure the SIS solenoid to the selected test state; and
    monitoring, via a valve positioner and using a processor, a response of the SIS solenoid at the selected test state to verify an operation condition of the SIS solenoid independent of an operation of the process control valve.

10. A method as defined in claim 9, wherein transmitting the power supply interruption control signal to the relay changes a state of the relay to interrupt a power supply signal of the SIS solenoid.

11. A method as defined in claim 9, wherein monitoring the response of the SIS solenoid to the selected state comprises:
    receiving a signal representative of a present state of the SIS solenoid; and
    determining whether the power supply interruption control signal configured the SIS solenoid to the selected state based on the received signal.

12. A method as defined in claim 9, further comprising:
receiving a valve position control signal via the one or more wires; and
controlling the position of the process control valve in response to the received valve position control signal.

13. A method as defined in claim 9, wherein the valve position control signal comprises a first highway addressable remote transducer (HART) command and the power supply interruption control signal comprises a second HART command.

14. An article of manufacture storing machine-readable instructions that, when executed, cause a machine to:
select a power supply interruption control signal to select a test state of a safety instrumented system (SIS) solenoid operatively coupled to a process control valve;
isolate control of the process control valve from the SIS solenoid by transmitting the power supply interruption control signal from a valve controller to a relay via one or more wires to configure the SIS solenoid to the selected test state; and
monitor a response of the SIS solenoid, using a processor, at the selected test state to verify an operation condition of the SIS solenoid independent of an operation of the process control valve.

15. An article of manufacture as defined in claim 14, wherein the machine-readable instructions, when executed, cause the machine to transmit the power supply interruption control signal to the relay to change a state of the relay to interrupt a power supply signal of the SIS solenoid.

16. An article of manufacture as defined in claim 14, wherein the machine-readable instructions, when executed, cause the machine to monitor the response of the SIS solenoid to the selected test state by:
receiving a signal representative of a present state of the SIS solenoid; and
determining whether the power supply interruption control signal configured the SIS solenoid to the selected test state based on the received signal.

17. An article of manufacture as defined in claim 14, wherein the machine-readable instructions, when executed, cause the machine to:
receive a valve position control signal via the one or more wires; and
control the position of the process control valve in response to the received valve position control signal. of a process control valve in response to the received valve position control signal.

* * * * *

UNITED STATES PATENT AND TRADEMARK OFFICE
CERTIFICATE OF CORRECTION

| | | |
|---|---|---|
| PATENT NO. | : 8,996,328 B2 | Page 1 of 1 |
| APPLICATION NO. | : 12/648695 | |
| DATED | : March 31, 2015 | |
| INVENTOR(S) | : Jimmie L. Snowbarger | |

It is certified that error appears in the above-identified patent and that said Letters Patent is hereby corrected as shown below:

In the Claims

In Column 12, line 21 (Claim 17): Delete "of a process control valve in response to the received valve position control signal." after --control the position of the process control valve in response to the received valve position control signal.--

Signed and Sealed this
Fourteenth Day of July, 2015

Michelle K. Lee
*Director of the United States Patent and Trademark Office*